(12) United States Patent
Bangerter et al.

(10) Patent No.: US 10,107,497 B2
(45) Date of Patent: Oct. 23, 2018

(54) GAS TURBINE ENGINE COMBUSTOR LINER

(71) Applicants: James P. Bangerter, Manchester, CT (US); Alexander W. Williams, Windsor Locks, CT (US); Nicholas Mule, Thousand Oaks, CA (US); Monica Pacheco-Tougas, Waltham, MA (US)

(72) Inventors: James P. Bangerter, Manchester, CT (US); Alexander W. Williams, Windsor Locks, CT (US); Nicholas Mule, Thousand Oaks, CA (US); Monica Pacheco-Tougas, Waltham, MA (US)

(73) Assignee: United Technologies Corporation, Farmington, CT (US)

( * ) Notice: Subject to any disclaimer, the term of this patent is extended or adjusted under 35 U.S.C. 154(b) by 1318 days.

(21) Appl. No.: 13/644,634

(22) Filed: Oct. 4, 2012

(65) Prior Publication Data
US 2014/0096527 A1  Apr. 10, 2014

(51) Int. Cl.
*F23R 3/06* (2006.01)
*F23R 3/00* (2006.01)
(Continued)

(52) U.S. Cl.
CPC ............... *F23R 3/06* (2013.01); *F23R 3/002* (2013.01); *F23R 3/04* (2013.01); *F23R 3/10* (2013.01);
(Continued)

(58) Field of Classification Search
CPC .... F23R 3/002; F23R 3/04; F23R 3/06; F23R 3/10; F23R 3/16; F23R 3/26;
(Continued)

(56) References Cited

U.S. PATENT DOCUMENTS 4,236,378 A  12/1980  Vogt
4,655,044 A  4/1987  Dierberger et al.
(Continued)

FOREIGN PATENT DOCUMENTS

JP  S5872822  4/1983
WO  9849496  11/1998

OTHER PUBLICATIONS

EP search report for EP13843296 dated Nov. 11, 2015.
International search report for PCT/US2013/063494 dated Jun. 26, 2014.

*Primary Examiner* — Ehud Gartenberg
*Assistant Examiner* — Scott Walthour
(74) *Attorney, Agent, or Firm* — O'Shea Getz P.C.

(57) ABSTRACT

A liner for a combustor of a turbine engine includes a cooling feature which projects from a backside and one or more effusion holes that communicate(s) through the liner. The effusion hole(s) surround an opening through said liner. The cooling feature may include a trip strip or a pyramid pin fin (e.g., a three-side pyramid pin fin, a conical pyramid pin fin). The effusion hole(s) may penetrate said cooling feature. The effusion hole(s) may define an angle less than or equal to ninety (90) degrees with respect to a face of said liner. The effusion hole(s) may be proximate an opening through said liner.

17 Claims, 10 Drawing Sheets

(51) Int. Cl.
*F23R 3/04* (2006.01)
*F23R 3/10* (2006.01)
*F23R 3/50* (2006.01)

(52) U.S. Cl.
CPC ...... *F23R 3/50* (2013.01); *F23R 2900/03041* (2013.01); *F23R 2900/03043* (2013.01); *F23R 2900/03044* (2013.01); *F23R 2900/03045* (2013.01); *Y02T 50/675* (2013.01)

(58) Field of Classification Search
CPC .. F23R 2900/03041; F23R 2900/03045; F05D 2260/2212; F05B 2260/222; F05B 2260/224; F05B 2260/2241
See application file for complete search history.

(56) References Cited

U.S. PATENT DOCUMENTS

| | | | |
|---|---|---|---|
| 4,695,247 A | 9/1987 | Enzaki et al. | |
| 4,748,806 A | 6/1988 | Drobny | |
| 5,113,660 A | 5/1992 | Able et al. | |
| 5,265,411 A | 11/1993 | Belsom | |
| 5,337,583 A | 8/1994 | Giles et al. | |
| 5,361,828 A * | 11/1994 | Lee et al. | 165/109.1 |
| 5,363,643 A | 11/1994 | Halila | |
| 5,553,455 A | 9/1996 | Craig et al. | |
| 5,758,503 A | 6/1998 | DuBell et al. | |
| 6,266,961 B1 | 7/2001 | Howell et al. | |
| 6,401,447 B1 | 6/2002 | Rice et al. | |
| 6,408,628 B1 | 6/2002 | Pidcock et al. | |
| 6,468,669 B1 * | 10/2002 | Hasz et al. | 428/553 |
| 6,543,233 B2 | 4/2003 | Young et al. | |
| 6,568,079 B2 | 5/2003 | Farmer et al. | |
| 6,581,285 B2 | 6/2003 | Emilianowicz | |
| 6,655,146 B2 | 12/2003 | Kutter et al. | |
| 6,675,582 B2 | 1/2004 | Monty et al. | |
| 6,701,714 B2 | 3/2004 | Burd et al. | |
| 6,868,675 B1 | 3/2005 | Kuhn et al. | |
| 7,124,487 B2 | 10/2006 | Kuhn et al. | |
| 7,546,684 B2 | 6/2009 | Caldwell et al. | |
| 7,900,457 B2 | 3/2011 | Patterson et al. | |
| 2002/0178734 A1 | 12/2002 | Stastny | |
| 2008/0115498 A1 | 5/2008 | Patel et al. | |
| 2008/0264065 A1* | 10/2008 | Gerendas | 60/754 |
| 2009/0000303 A1* | 1/2009 | Patel et al. | 60/752 |
| 2010/0186416 A1* | 7/2010 | Chen et al. | 60/755 |
| 2010/0229564 A1* | 9/2010 | Chila | F23R 3/06 60/752 |

* cited by examiner

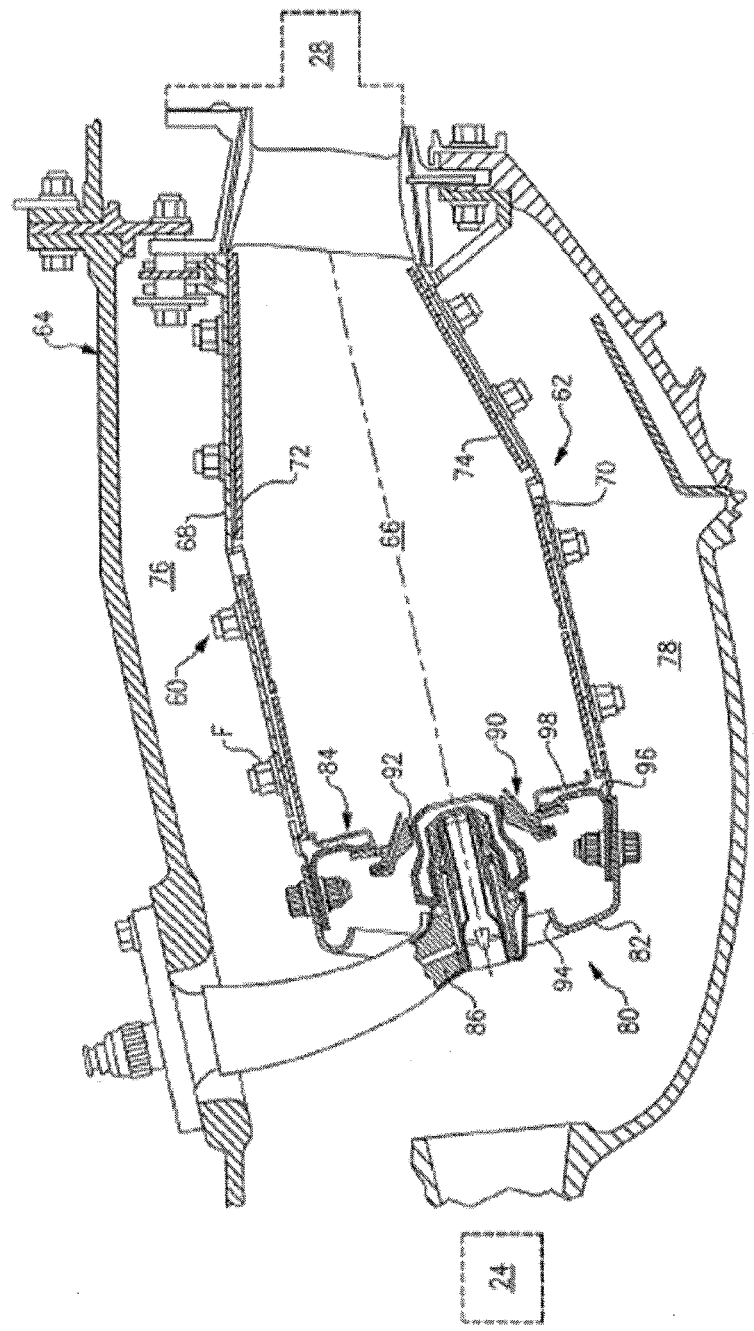

FIG.2

LEGEND:
24: compressor section
28: turbine section
60: combustor outer wall
62: combustor inner wall
64: diffuser case
66: chamber
68: combustor outer wall shell
70: combustor inner wall shell
72: outer liner
74: inner liner
76: outer plenum
78: inner plenum
80: forward assembly
82: hood
84: bulkhead assembly
86: fuel nozzle
90: fuel nozzle guide
92: central opening
94: hood port
96: bulkhead support shell
98: heat shield
F: fastener

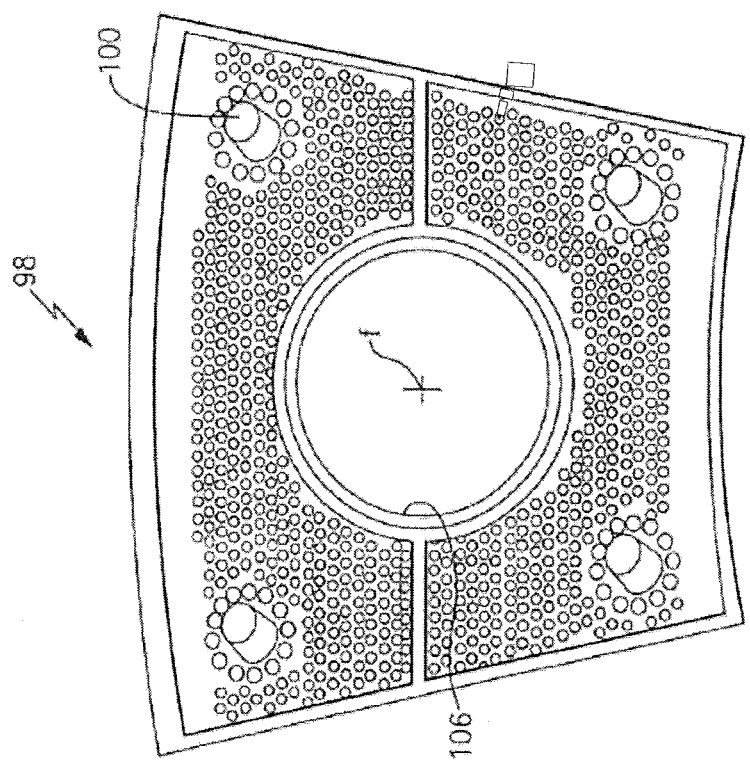
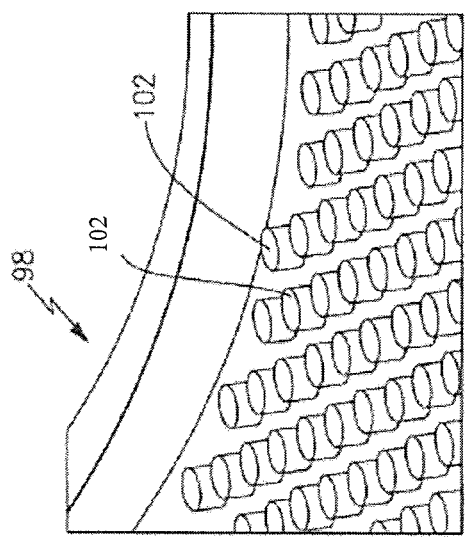

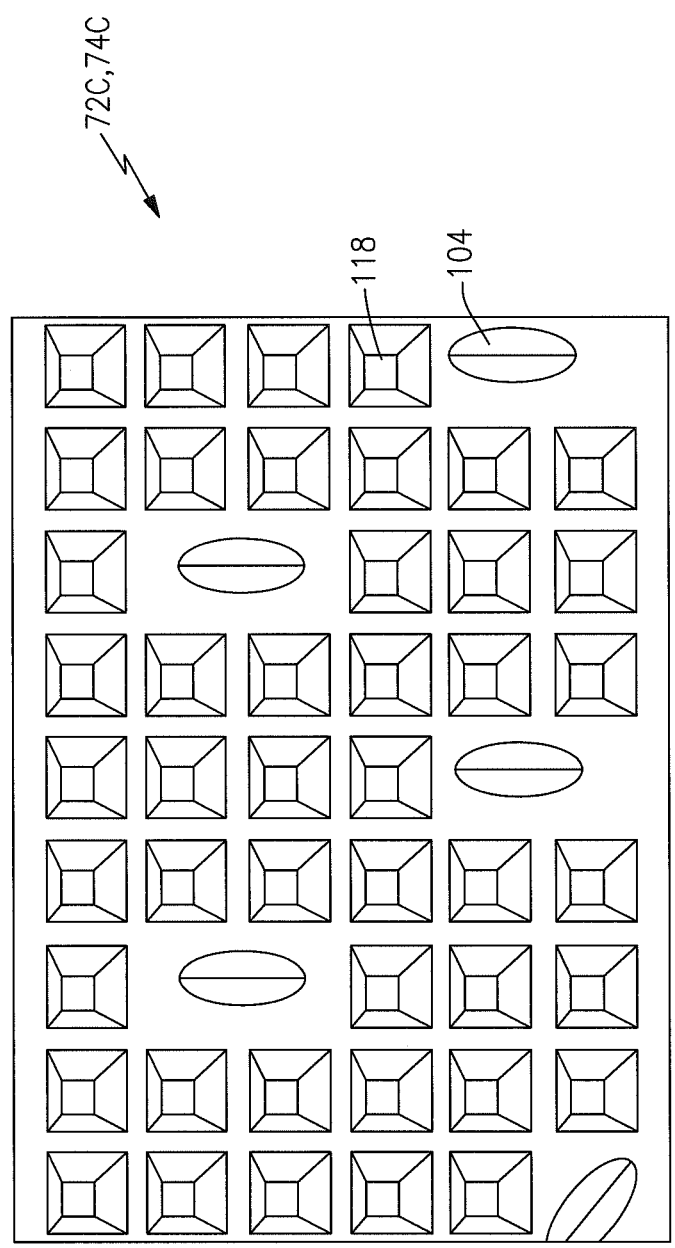

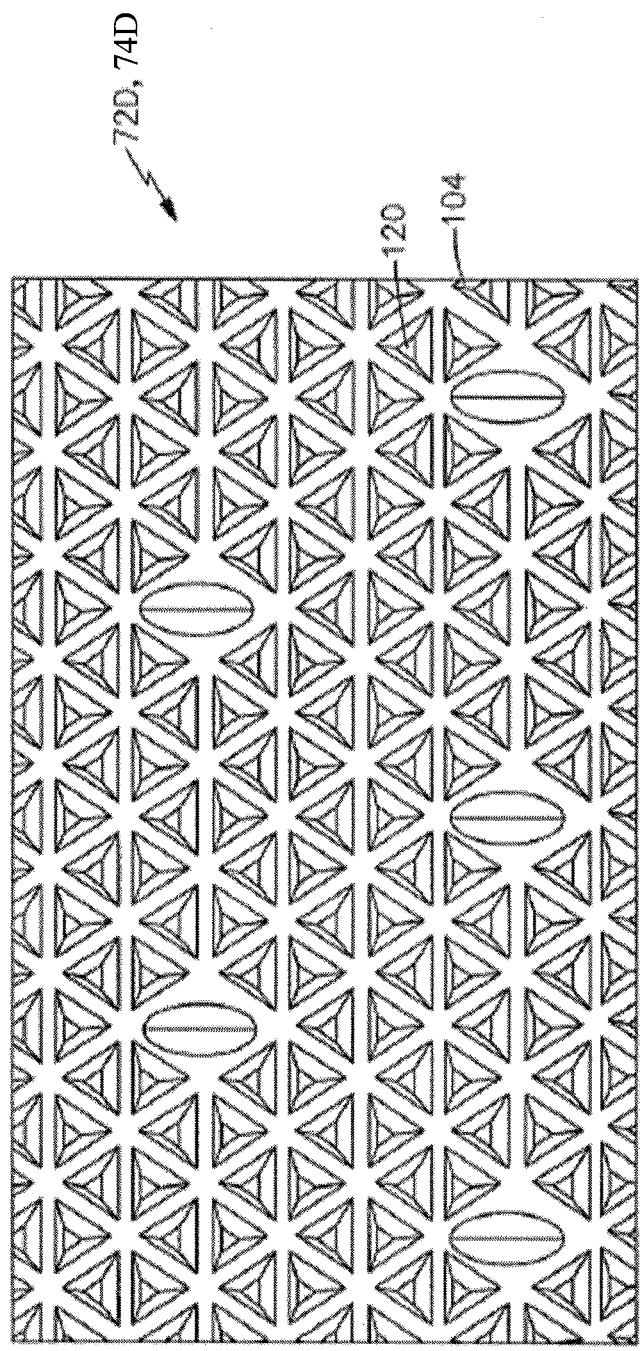

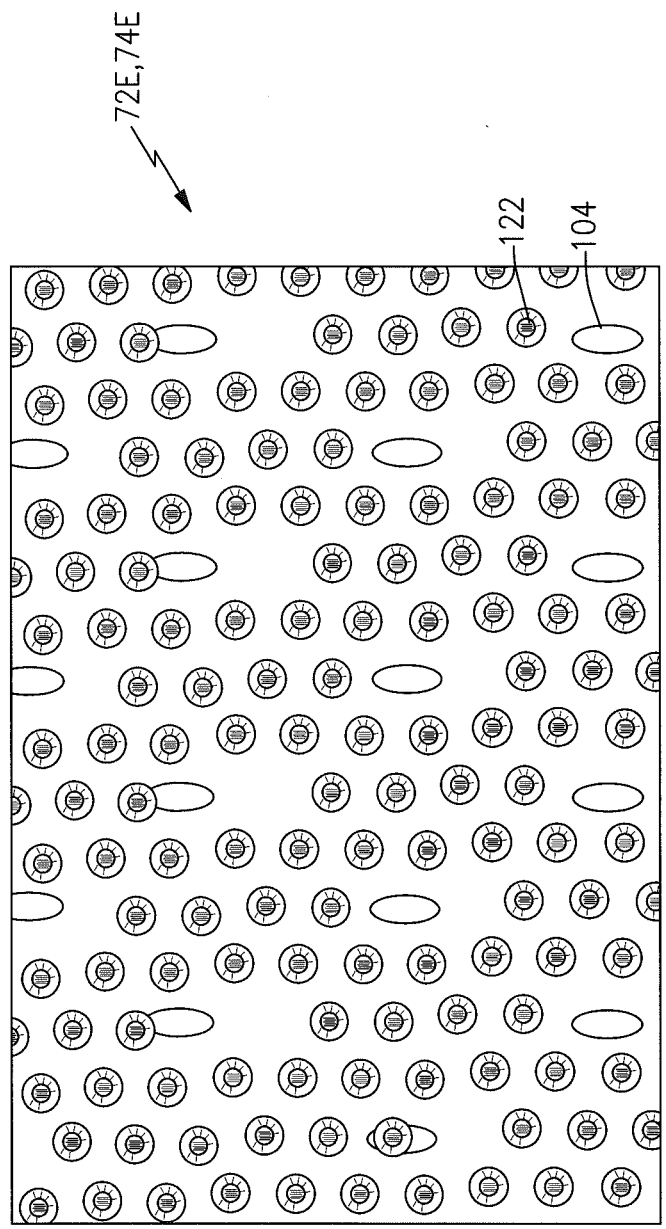

GAS TURBINE ENGINE COMBUSTOR LINER

BACKGROUND

The present disclosure relates to a gas turbine engine and, more particularly, to combustor liners with effusion cooling and backside features.

Gas turbine engines, such as those powering modern commercial and military aircraft, include a compressor for pressurizing an airflow, a combustor section to burn a hydrocarbon fuel in the presence of the pressurized air, and a turbine section to extract energy from the resultant combustion gases.

The desire for combustors that can survive high temperatures yet use less cooling air requires improved cooling efficiency.

SUMMARY

A liner of a combustor for a turbine engine according to one disclosed non-limiting embodiment of the present disclosure includes a backside, a cooling feature projecting from the backside, and an effusion hole that communicates through the liner.

In a further embodiment of the foregoing embodiment, the cooling feature includes a trip strip.

In a further embodiment of any of the foregoing embodiments, the cooling feature includes a pyramid pin fin.

In a further embodiment of any of the foregoing embodiments, the cooling feature includes a three-sided pyramid pin fin.

In a further embodiment of any of the foregoing embodiments, the cooling feature includes a conical pyramid pin fin.

In a further embodiment of any of the foregoing embodiments, the effusion hole penetrates the cooling feature.

In a further embodiment of any of the foregoing embodiments, the effusion hole defines an angle less than or equal to ninety (90) degrees with respect to a face of the liner.

In a further embodiment of any of the foregoing embodiments, the effusion hole is proximate and surrounds an opening through the liner.

A combustor of a turbine engine according to another disclosed non-limiting embodiment of the present disclosure includes a liner with a cooling feature on a backside thereof and a multiple of effusion holes therethrough.

In a further embodiment of the foregoing embodiment, the cooling feature includes a pin.

In a further embodiment of any of the foregoing embodiments, the cooling feature includes a pyramid pin fin.

In a further embodiment of any of the foregoing embodiments, the cooling feature includes a three-sided pyramid pin fin.

In a further embodiment of any of the foregoing embodiments, the cooling feature includes a conical pyramid pin fin.

In a further embodiment of any of the foregoing embodiments, the effusion hole penetrates through at least one of the multiple of cooling features.

In a further embodiment of any of the foregoing embodiments, the at least one of the multiple of effusion holes defines an angle with respect to a face of the liner.

In a further embodiment of any of the foregoing embodiments, the effusion hole is defined adjacent to an opening through the liner.

A combustor of a turbine engine according to another disclosed non-limiting embodiment of the present disclosure includes a bulkhead liner with a cooling feature on a backside thereof and a multiple of effusion holes therethrough, the multiple of effusion holes surrounding an opening through the bulkhead liner.

In a further embodiment of the foregoing embodiment, the axis defined by a fuel injector passes through the opening.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a perspective partial sectional view of an annular combustor that may be used with the gas turbine engine shown in FIG. 1;

FIG. 4 is a backside view of a liner according to one disclosed non-limiting embodiment;

FIG. 5 is an expanded view of a portion of the backside of the combustor panel of FIG. 4;

FIG. 9 is a backside view of a combustor panel according to another disclosed non-limiting embodiment;

FIG. 10 is a backside view of a combustor panel according to another disclosed non-limiting embodiment; and FIG. 11 is a backside view of a combustor panel according to another disclosed non-limiting embodiment.

DETAILED DESCRIPTION

Figure 1:
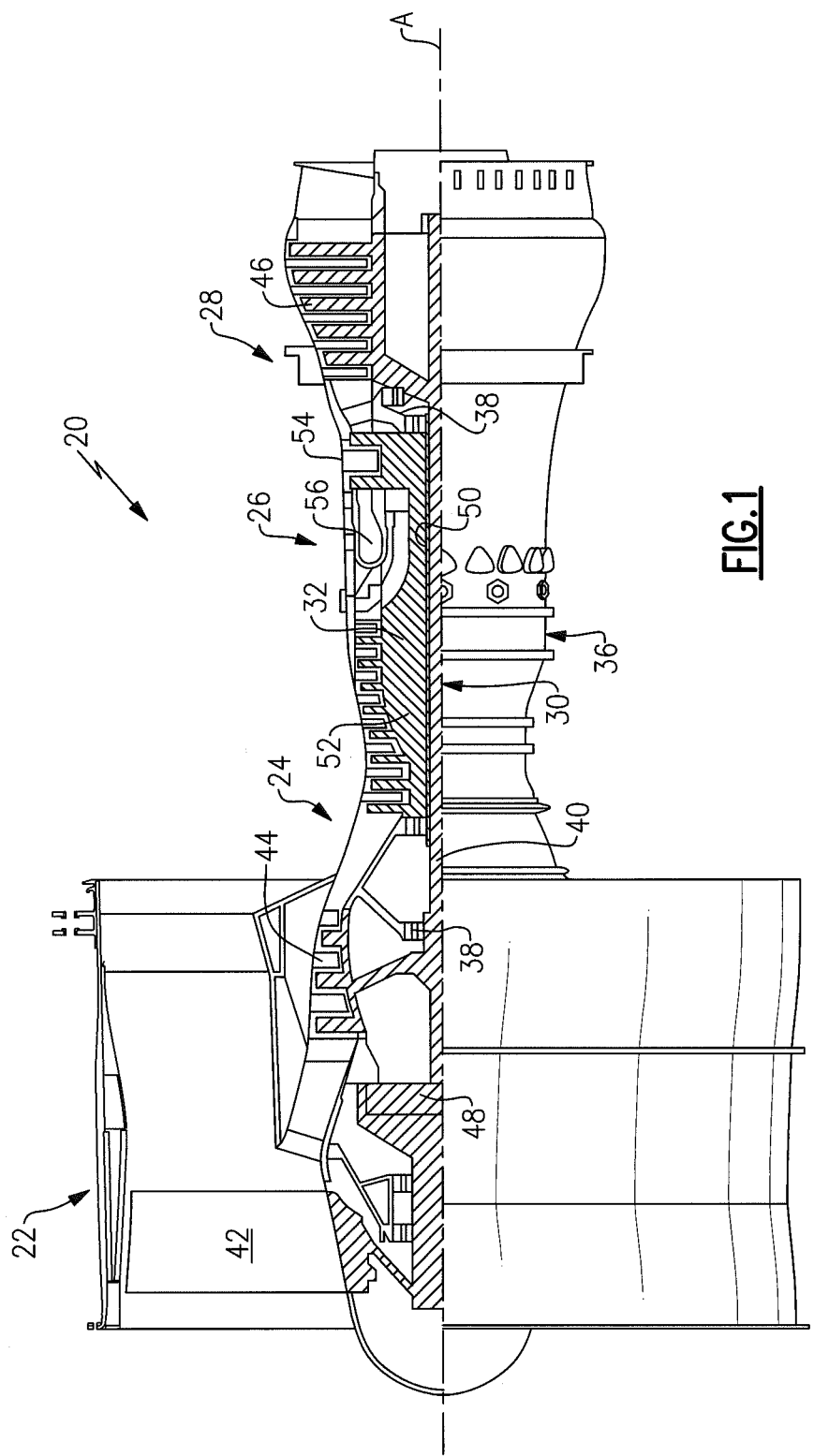
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of "T"/$518.7^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

With reference to FIG. 2, the combustor 56 generally includes a combustor outer wall 60 and a combustor inner wall 62. The outer wall 60 and the inner wall 62 are spaced inward from a respective outer and inner wall of a diffuser case module 64 such that a chamber 66 is defined therebetween. The chamber 66 is generally annular in shape and is defined between the walls 60, 62. Associated with the outer wall 60 and the inner wall 62 may be fasteners F.

The outer wall 60 and the diffuser case module 64 define an annular outer plenum 76 and the inner wall 62 and the diffuser case module 64 define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Each wall 60, 62 generally includes a respective support shell 68, 70 that supports one or more respective liners 72, 74 mounted to a hot side of the respective support shells 68, 70. The liners 72, 74 define a liner array that may be generally annular in shape. Each of the liners 72, 74 may be generally rectilinear and manufactured of for example, a nickel based super alloy or ceramic material.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown) that define a central opening 92. The annular hood 82 extends radially between, and may be secured to, the forwardmost ends of the liners 60, 62. The annular hood 82 includes a multiple of circumferentially distributed hood ports 94 that accommodate the respective fuel nozzle 86 and introduce air into the forward end of the combustion chamber 66. Each fuel nozzle 86 may be secured to the outer case module 64 to project through one of the hood ports 94 and through the central opening 92 within the respective fuel nozzle guide 90.

Figure 3:
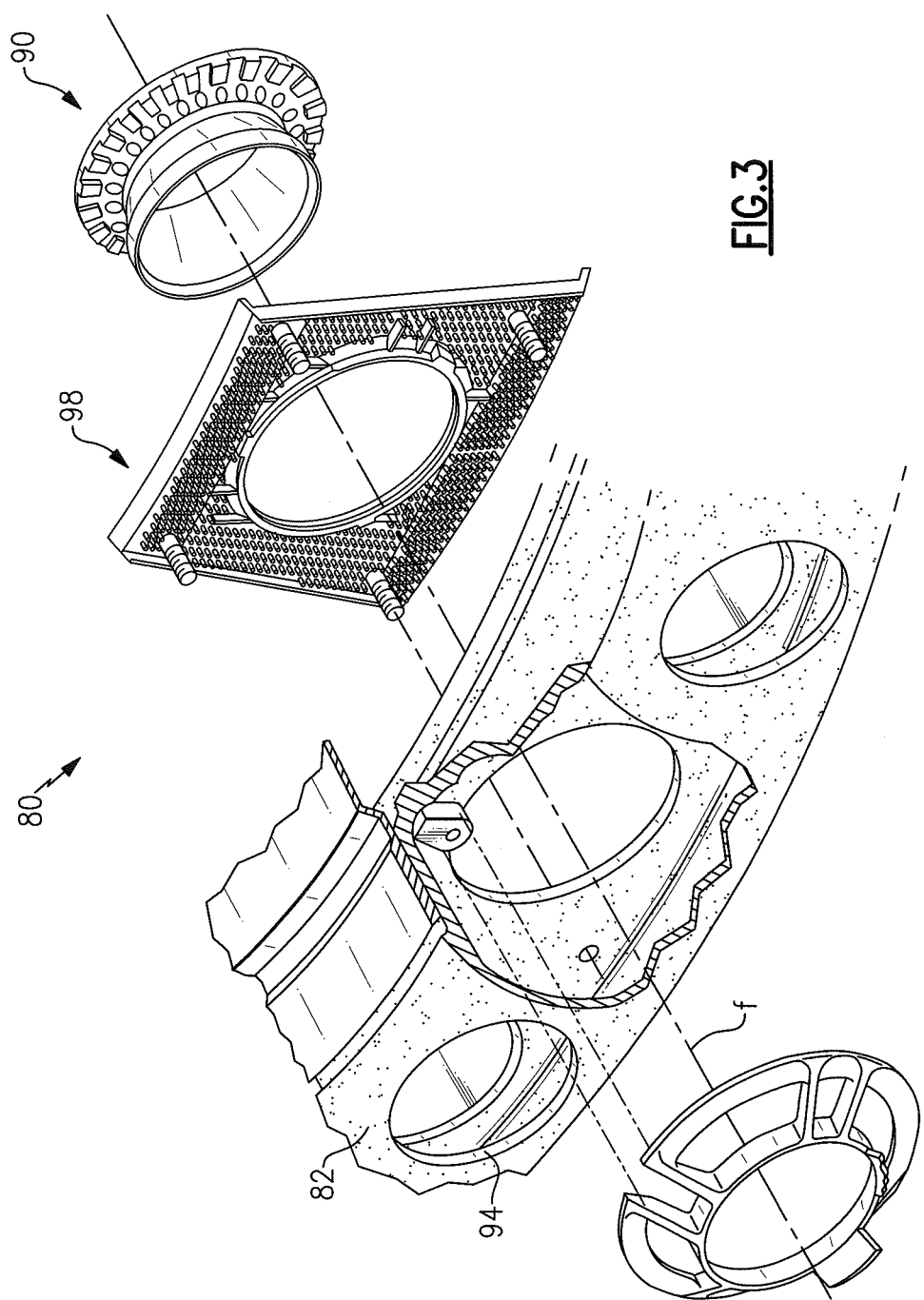
FIG. 3 is an exploded view of a forward assembly of the combustor.

Each of the fuel nozzle guides 90 is circumferentially aligned with one of the hood ports 94 to project through the bulkhead assembly 84. Each bulkhead assembly 84 includes a bulkhead support shell 96 secured to the liners 60, 62, and a multiple of circumferentially distributed liners 98 secured to the bulkhead support shell 96 around the central opening 92 (also Shown in FIG. 3). Each of the fuel nozzle guides 90 is dimensioned to mount a respective fuel nozzle 86.

The forward assembly 80 introduces primary core combustion air into the forward end of the combustion chamber 66 while the remainder enters the outer annular plenum 76 and the inner annular plenum 78. The multiple of fuel nozzles 86 and surrounding structure generate a swirling, intimately blended fuel-air mixture that supports combustion in the forward section of the combustion chamber 66.

With reference to FIG. 11, each of the liners 72, 74, and/or bulkhead-type liner 98 (shown about an axis f corresponding to the axis f shown in FIG. 3) include a multiple of support studs 100, cooling features 102 which project from a backside of the of the liners 72, 74, and/or 98, and effusion holes 104. In this disclosed non-limiting embodiment, a bulkhead-type liner or heat shield 98 is illustrated, however, the cooling features 102 and the effusion holes 104 are readily applicable to liners 72, 74 (FIGS. 2 and 6-11). It should be further understood that although a significant number of cooling features 102 and effusion holes 104 are illustrated, any number of cooling features 102 and/or effusion holes 104—including singles—may alternatively be provided.

The effusion holes 104 generally surround a fuel nozzle opening 106 and in some instances extend directly through the cooling features 102 (FIG. 5). It should be appreciated that the effusion holes 104 may be bored through the cooling features 102 or designed to penetrate areas without the cooling features 102.

Figure 6:
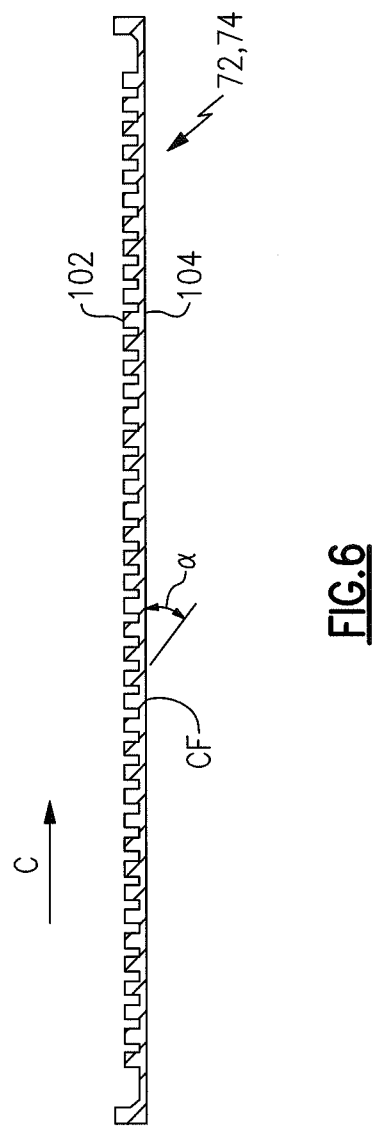
FIG. 6 is a backside view of a combustor panel according to another disclosed non-limiting embodiment.

With reference to FIG. 6, the effusion holes 104 define an angle α with respect to a face CF of the liners 72, 74. In the disclosed non-limiting embodiment, the angle α with respect to the face CF may be approximately thirty (30) degrees and oriented along a flow of the combustion gases (illustrated schematically by arrow C). This facilitates the optimization of backside cooling with the benefits of effusion panel cooling as well as impingement cooling. In this disclosed non-limiting embodiment, and those that follow the liners 72, 74 are illustrated, however, the cooling features 102 and the effusion holes 104 disclosed are readily applicable to bulkhead liners 98 (FIGS. 4-5).

Figure 7:
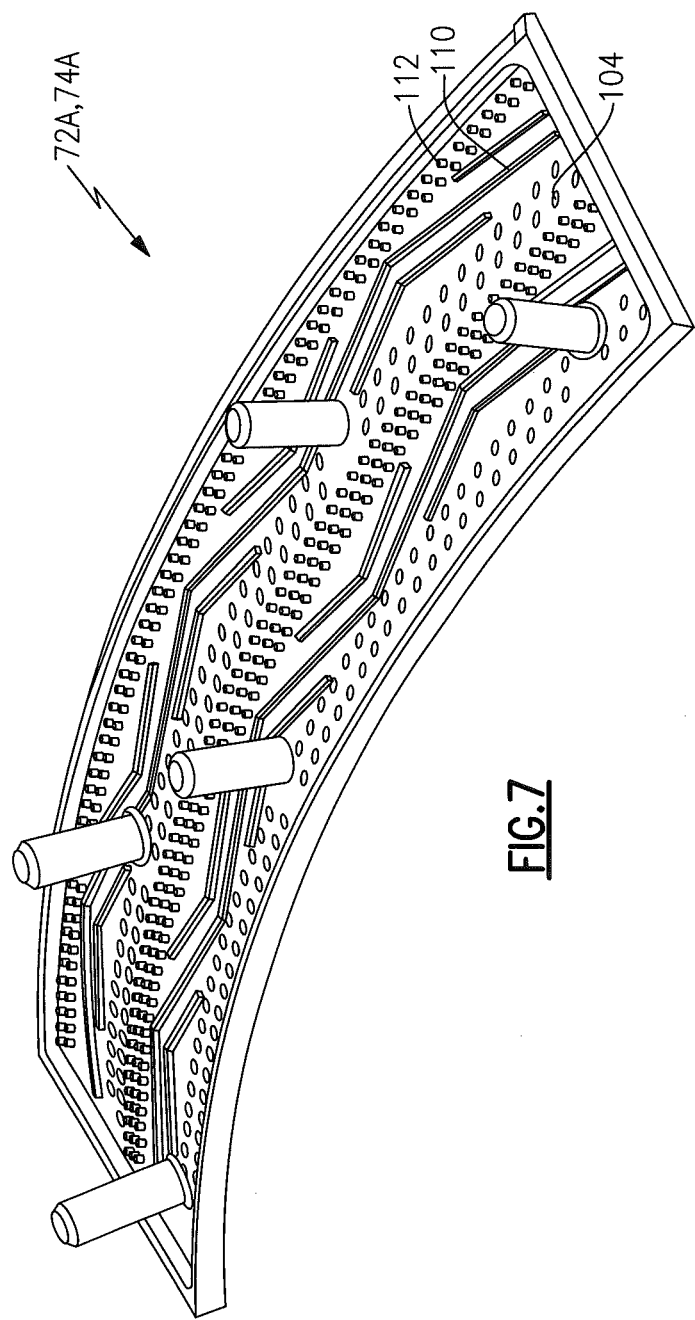
FIG. 7 is a backside view of a combustor panel according to another disclosed non-limiting embodiment.

With reference to FIG. 7, a liner 72A, 74A of another disclosed non-limiting embodiment includes a multiple of non-linear trip strips 110, a multiple of pins 112 and effusion holes 104. The multiple of pins 112 in the disclosed non-limiting embodiment are square shaped pins, however, any shape may be provided.

Figure 8:
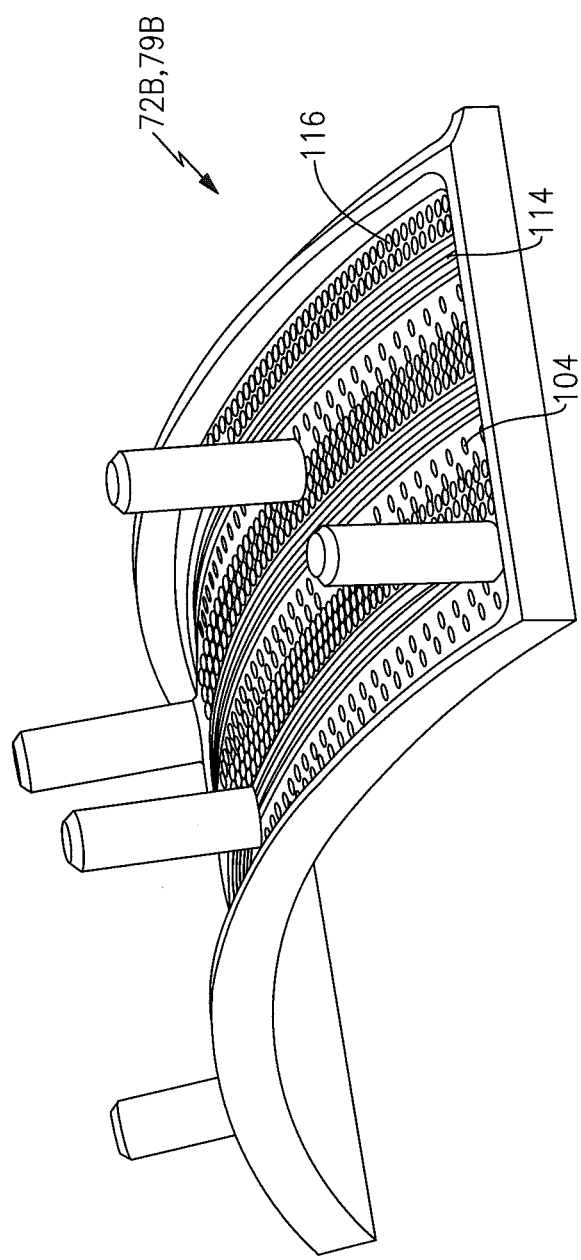
FIG. 8 is a backside view of a combustor panel according to another disclosed non-limiting embodiment.

With reference to FIG. 8, a liner 72B, 74B of another disclosed non-limiting embodiment includes a multiple of substantially linear trip strips 114, a multiple of pin fins 116 and the effusion holes 104.

With reference to FIG. 9, a liner 72C, 74C of another disclosed non-limiting embodiment includes a multiple of pyramid pin fins 118 and the effusion holes 104. In this non-limiting embodiment, each of the effusion holes 104 are aligned with a row of the multiple of pyramid pin fins 118 and need not pass therethrough. It should be appreciated that the effusion holes 104 may alternatively pass through one or more of the multiple of pyramid pin fins 118.

With reference to FIG. 10, liners 72D, 74D of another disclosed non-limiting embodiment includes a multiple of three-sided pyramid pin fins 120 and the effusion holes 104. In this non-limiting embodiment, each of the effusion holes 104 are aligned with a row of the multiple of three-sided pyramid pin fins 120 and need not pass therethrough.

With reference to FIG. 11, liners 72E, 74E of another disclosed non-limiting embodiment includes a multiple of conical pin fins 122 and the effusion holes 104.

It should be appreciated that various combinations, types and sizes of cooling features or other heat transfer augmenting geometries may be utilized in combination with effusion holes to achieve maximum cooling with a given amount of cooling air.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A liner of a combustor for a turbine engine, the liner comprising:
   a backside;
   a plurality of cooling features projecting from said backside, wherein said plurality of cooling features includes at least one of:
   a pyramid pin fin,
   a three-sided pyramid pin fin, or
   a conical pyramid pin fin; and
   a plurality of effusion holes that communicate through said liner,
   wherein each of the effusion holes are aligned with a row of the at least one of the pyramid pin fin, the three-sided pyramid pin fin, or the conical pyramid pin fin.

2. The liner as recited in claim 1, wherein said cooling features include the pyramid pin fin.

3. The liner as recited in claim 1, wherein said cooling features include the three-sided pyramid pin fin.

4. The liner as recited in claim 1, wherein said cooling features include the conical pyramid pin fin.

5. The liner as recited in claim 1, wherein at least one of said effusion holes defines an angle less than or equal to ninety degrees with respect to a face of said liner.

6. The liner as recited in claim 1, wherein at least one of said effusion holes is proximate an opening through said liner.

7. A combustor of a turbine engine comprising:
   a liner with a plurality of cooling features on a backside thereof and a multiple of effusion holes therethrough, wherein said cooling features include at least a non-linear trip strip and at least one of:
   a pyramid pin fin,
   a three-sided pyramid pin fin, or
   a conical pyramid pin fin,
   wherein each of the effusion holes are aligned with a row of the at least one of the pyramid pin fin, the three-sided pyramid pin fin, or the conical pyramid pin fin.

8. The combustor as recited in claim 7, wherein said cooling features include the pyramid pin fin.

9. The combustor as recited in claim 7, wherein said cooling features include the three-sided pyramid pin fin.

10. The combustor as recited in claim 7, wherein said cooling features include the conical pyramid pin fin.

11. The combustor as recited in claim 7, wherein at least one of said multiple of effusion holes defines an angle with respect to a face of said liner.

12. The combustor as recited in claim 7, wherein at least one of said effusion holes is defined adjacent to an opening through said liner.

13. A combustor of a turbine engine comprising:
   a bulkhead liner with a plurality of cooling features on a backside thereof and a multiple of effusion holes therethrough, said multiple of effusion holes surround an opening through said bulkhead liner,
   wherein said cooling features include at least a non-linear trip strip and at least one of:
      a pyramid pin fin,
      a three-sided pyramid pin fin, or
      a conical pyramid pin fin,
   wherein each of the effusion holes are aligned with a row of the at least one of the pyramid pin fin, the three-sided pyramid pin fin, or the conical pyramid pin fin.

14. The combustor as recited in claim 13, wherein an axis defined by a fuel injector passes through said opening.

15. The liner as recited in claim 1, wherein at least one of said effusion holes defines an angle of approximately thirty degrees with respect to a face of said liner.

16. The combustor as recited in claim 7, wherein at least one of said multiple of effusion holes defines an angle of approximately thirty degrees with respect to a face of said liner and is oriented along a flow of combustion gases.

17. The combustor as recited in claim 13, wherein at least one of said multiple of effusion holes defines an angle of approximately thirty degrees with respect to a face of said bulkhead liner.

* * * * *